(12) United States Patent
Gaudlip (10) Patent No.: US 11,805,069 B1
(45) Date of Patent: Oct. 31, 2023

(54) VIRTUAL TIERING (71) Applicant: EMC IP Holding Company LLC, Hopkinton, MA (US)

(72) Inventor: Christopher J. Gaudlip, Plano, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 885 days.

(21) Appl. No.: 14/585,809

(22) Filed: Dec. 30, 2014

(51) Int. Cl.
*H04L 47/78* (2022.01)
*H04L 43/08* (2022.01)
*G06Q 30/04* (2012.01)

(52) U.S. Cl.
CPC .............. *H04L 47/78* (2013.01); *G06Q 30/04* (2013.01); *H04L 43/08* (2013.01)

(58) Field of Classification Search
CPC .......... G06Q 30/04; H04L 43/08; H04L 47/78
USPC .......................................................... 705/51
See application file for complete search history.

(56) References Cited

U.S. PATENT DOCUMENTS

| | | | | |
|---|---|---|---|---|
| 2003/0046396 A1* | 3/2003 | Richter | ................... | G06F 9/505 709/226 |
| 2011/0213686 A1* | 9/2011 | Ferris | ..................... | H04L 47/72 718/1 |
| 2013/0124712 A1* | 5/2013 | Parker | .................... | H04L 43/55 709/224 |
| 2014/0033268 A1* | 1/2014 | Julisch | ................... | H04L 63/20 726/1 |
| 2014/0108665 A1* | 4/2014 | Arora | .................... | H04L 67/563 709/227 |
| 2015/0365281 A1* | 12/2015 | Marino | ................. | G06Q 30/04 709/223 |

OTHER PUBLICATIONS

How Computers Work 7th Ed, p. 4, last para Oct. 15, 2003.*
Ron White, How Computers Work, Oct. 15, 2003, Paul Boger, Illustrated by Timothy Edward Downs, 7th Edition (Year: 2003).*

* cited by examiner

*Primary Examiner* — Mohammad A. Nilforoush
*Assistant Examiner* — Wodajo Getachew
(74) *Attorney, Agent, or Firm* — Ryan, Mason & Lewis, LLP (57) ABSTRACT

A System, Computer Program Product, and computer-executable method for managing a virtual network, the System, Computer Program Product, and computer-executable method comprising receiving a request to create the virtual network, creating a policy based on a catalog virtual network resources, and implementing the virtual network based on the created policy.

20 Claims, 11 Drawing Sheets

| Tier | Iron | Bronze | Silver | Gold | Platinum |
|---|---|---|---|---|---|
| Cost | $ | $$ | $$$ | $$$$ | $$$$ |
| Bandwidth - Interswitch (MBs) | FIFO | FIFO | Prioritized | QoS | Dedicated |
| Bandwidth - vLAN (MBs) | FIFO | FIFO | Prioritized | QoS | Dedicated |
| LoadBalancer (MBs) | FIFO | FIFO | Prioritized | QoS | Dedicated |
| Buffering (MBs) | FIFO | FIFO | Prioritized | QoS | Dedicated |
| Packet Acceleration (MBs) | --- | --- | Low | Medium | High |
| Deduplication (on/off) | OFF | OFF | OFF | ON | ON |
| Compression (on/off) | OFF | ON | ON | ON | ON |
| FAST Pass (on/off) | OFF | OFF | OFF | OFF | ON |

Fig. 1

| Tier | Iron | Bronze | Silver | Gold | Platinum |
|---|---|---|---|---|---|
| Cost | $ | $$ | $$$ | $$$$ | $$$$ |
| Bandwidth - Interswitch (MBs) | FIFO | FIFO | Prioritized | QoS | Dedicated |
| Bandwidth - vLAN (MBs) | FIFO | FIFO | Prioritized | QoS | Dedicated |
| LoadBalancer (MBs) | FIFO | FIFO | Prioritized | QoS | Dedicated |
| Buffering (MBs) | FIFO | FIFO | Prioritized | QoS | Dedicated |
| Packet Acceleration (MBs) | --- | --- | Low | Medium | High |
| Deduplication (on/off) | OFF | OFF | OFF | ON | ON |
| Compression (on/off) | OFF | ON | ON | ON | ON |
| FAST Pass (on/off) | OFF | OFF | OFF | OFF | ON |

VIRTUAL TIERING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer Program Product, and computer-executable method for managing a virtual network, the System, Computer Program Product, and computer-executable method comprising receiving a request to create the virtual network, creating a policy based on a catalog of virtual network resources, and implementing the virtual network based on the created policy.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, network resource provisioning involves allocating devices and or resources for use by an application. Normally, users provide the maximum amount of resources required for each respective application, or use, which may include current and future requirements. Conventionally, users are not able to dynamically manage network resource provisioning to affect performance and/or segregate workloads into multiple networks without physical intervention. Conventionally, allocating resources for future requirements means that powerful and expensive resources may be taken or reserved from the total amount of usable resources even though a portion of the resource may be unutilized. As such, traditional implementations may be problematic as they often lead to inefficient use of resources, as both current and future resource requirements are taken into account.

In many embodiments, the current disclosure may enable implementation of Virtual Tiering (VTiers) of Virtual Network Resources. In various embodiments, VTiers may include combining virtual network resources and providing the virtual network resources to one or more users on an as needed basis. In other embodiments, VTiers may include providing one or more users one or more tiers of services. In some embodiments, VTiers may include providing the ability for a user to move between tiers of service on an as needed basis. In certain embodiments, a tier of service may include one or more virtual networking devices and/or an amount of virtual bandwidth.

In many embodiments, virtual network resources in an environment may include one or more layers. In certain embodiments, a virtual network resource may include, but is not limited to, network bandwidth and virtual network devices, such as routers, switches, firewalls, load balancers, and/or other network devices. In various embodiments, the current disclosure may enable dynamic allocation, removal, and/or management of virtual network resources based on one or more user needs. In certain embodiments, the current disclosure may enable allocation, removal, and/or management of virtual network resources based on one or more policies. In other embodiments, the current disclosure may enable allocation, removal, and/or management of virtual network resources based on current usage by consumers of the virtual network resources. In some embodiments, VTiers for virtual network resources may be enabled to allocate, remove, and/or manage virtual network resources when one or more user requirements exist, rather than when the hardware is initially configured.

In most embodiments, the current disclosure may be enabled to allocate and/or manage virtual network resources, such as data transports and/or bandwidth, into individualized "mini networks" on an "as needed" basis. In various embodiments, a system using virtual network resources may have the illusion that the system has more bandwidth/hardware capability than may be physically provided.

In most embodiments, the current disclosure may enable creation of integrated monitoring tools which may enable monitoring of usage of virtually provisioned network resources to ensure that no resource may be overburdened during peak network processing. In various embodiments, integrated monitoring tools may utilize active resource management that may enable optimum processing bandwidth to be maintained. In some embodiments, the current disclosure may enable creation of policies defined by users and/or administrators to create cost effective bandwidth solutions with the dynamic ability to be modified along with the changing needs of the users and/or administrators, thereby reducing overall cost. In other embodiments, the current disclosure may enable use of a set of policies that may take into account the varying needs of a user and/or administrator to dynamically and automatically vacillate between the "layers" to consistently meet the most pressing of requirements.

In many embodiments, VTiers for virtual network resources may help customers drive down their total cost of ownership (TCO) by improving demand management and optimizing hardware capabilities for supporting growth. In various embodiments, VTiers for virtual networking resources may become part of green computing initiatives because VTiers for virtual networking resources may reduce power and cooling costs by cutting down the amount of idle devices on a data center floor. In certain embodiments, VTiers for virtual networking resources may drive standardization and overall efficiency of use of resources.

In still other embodiments, the present disclosure may enable creation of policies to manage network resources within a solution. In various embodiments, a policy may be defined by a vendor and a user to create a cost-effective computer solution with a dynamic ability to change along with the needs of the customer, thereby reducing overall cost. In some embodiments, the present disclosure may enable a system to allocate network resources for one or more layers. In certain embodiments, a layer may be a device, component, or functionality that is virtualized. In some embodiments, a virtual network resource may include, but is not limited to, network bandwidth and virtual network devices, such as routers, switches, firewalls, load balancers, and/or "Fast Pass" performance boost. In most embodiments, a load balancer may be an asset that performs bandwidth distribution. In various embodiments, Fast Pass performance boost may utilize technology to increase overall performance of network resources, or underlying infrastructure such allowing more access to network bandwidth and/or greater switching capability. In certain embodiments, a Fast Pass may be modified with current and/or future capabilities of network resources.

In some embodiments, the current disclosure may enable a user to choose a network resource configuration that meets the customer's performance needs weighed against their financial constraints. In certain embodiments, performance needs and financial constraints may fluctuate in importance over time, such as daily, monthly, quarterly, or yearly. In further embodiments, the present disclosure may enable the creation of a set of policies that may take into account varying needs of a customer to dynamically and/or automatically vacillate between resource tiers to consistently meet the most pressing of requirements.

In certain embodiments, a customer may require more network resources during peak season and less computer resources during off season, but may need to maintain a consistent rate of processing through the entire year. In further embodiments, a customer may be able to process business requests at the same rate regardless of which season the request is received. In other embodiments, the present disclosure may enable the customer to set policies to address seasonal computer resource needs dynamically and/or automatically.

In some embodiments, a service catalog may be a catalog of resources or services available for purchase by a business. In further embodiments, service catalogs may describe or offer services or resources in business terms. In certain embodiments, service catalogs may be tailored to the specific business, service level, or speed to market requirement of a line of business (LOB). In other embodiments, service catalogs may describe common IT services needed by businesses where the descriptions are detached from the underlying technology decisions. In certain embodiments, industry standard terms may be used to purchase resources.

In some embodiments, the current disclosure may enable billing for virtual network resources and/or other resources according to the amount of resources actually utilized within a billing cycle. In further embodiments, resources may be billed based on the tier of the resources used and the workload accomplished using those resources. In other embodiments, businesses may be enabled to purchase service for a specific quantity of applications and/or users.

In some embodiments, tiered service categories may balance network resource performance and cost targets relative to the business criticality of each application. In certain embodiments, criticality may be an attribute of an application which may be determined by the acceptable performance of that application. In other embodiments, an application may be noncritical if transactional delays or service failures are tolerable. In some embodiments, an application may be critical if swift and/or reliable performance is required. In other embodiments, there may be multiple levels of criticality that may be defined by various performance requirements.

In further embodiments, LOBs may gain ease and flexibility from simplified, normalized service level requests. In certain embodiments, the present disclosure may enable businesses to communicate in business terms about highly technical resources. In other embodiments, automated policy driven tiering may allow businesses to rapidly adjust between tiers. In some embodiments, automated policy driven tiers may allow for more granular control of the computer resource tier allocation for specific applications.

In most embodiments, the current disclosure may enable creation of a Virtual Tiered Virtual Network Resource (VTVNR) system. In various embodiments, a VTVNR system may be enabled to provide virtual network resources to one or more users requesting network resources. In certain embodiments, a VTVNR system may include an interface module, policy management module, monitoring module, service catalog module, resource management module, and/ or a billing module. In most embodiments, an interface module may manage communication with users, administrators, virtual platforms, and/or other consumers of a VTVNR system. In various embodiments, an interface module may enable consumers of the VTVNR system to use and/or configure the VTVNR system and may enable access to other modules within the VTVNR system.

In many embodiments, a policy management module may be enabled to create, remove, and/or modify policies managing consumers of the VTVNR system. In various embodiments, a policy management module may be enabled to manage one or more policies related to one or more virtual networks allocated by the VTVNR system. In certain embodiments, a monitoring module may be enabled to monitor user of VTVNR system resources when fulfilling requests for virtual network resources. In some embodiments, a monitoring module may be enabled to determine whether one or more resources within the VTVNR system may be overtaxed and the monitoring module may be enabled to direct the VTVNR system to load balance the virtual network. In certain embodiments, a monitoring module may be enabled to notify a user and/or administrator of higher than normal and/or lower than normal use such that the user and/or administrator may be enabled to modify a policy to take into account a change in use of virtual network resources.

In most embodiments, a service catalog module may be enabled to store and/or catalog the tiers of virtual network resources that the VTVNR system may be enabled to provide to users and/or administrators of the VTVNR system. In various embodiments, the service catalog module may be enabled to dynamically modify pricing and/or Tiered options based on available resources within the VTVNR system. In certain embodiments, a user and/or administrator may be enabled to create, modify, and/or remove tiers of virtual network resources. In some embodiments, users and/or administrators may be enabled to utilize the service catalog module to create and/or modify policies managed by the policy management module. In various embodiments, a resource management module may be enabled to allocate, de-allocate, and/or manage virtual resources available using the VTVNR system. In many embodiments, a billing module may be enabled to provide a user and/or administrator with information related to the cost of services used. In most embodiments, the billing module is enabled to communicate with the monitoring module to determine how much of each resource and/or each tier of resources one or more users may have consumed. In certain embodiments, a billing module may be enabled to provide a cost analysis of virtual network resources used. In other embodiments, a billing module may be enabled to provide a cost comparison with possible alternative virtual network configurations to users and/or administrators.

Figure 1:
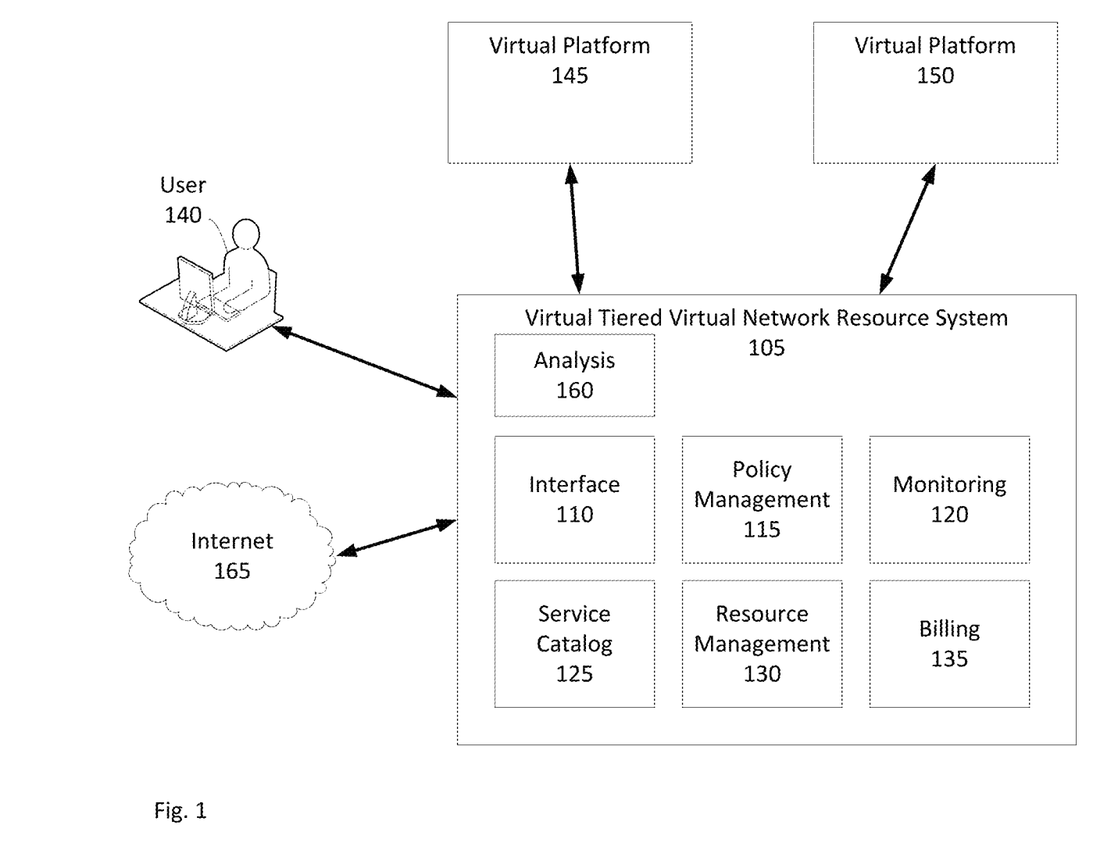
FIG. 1 is a simplified illustration of a Virtual Tiered Virtual Network Resource System providing resources to users, in accordance with an embodiment of the present disclosure.

Refer to the example embodiment of FIG. 1. FIG. 1 is a simplified illustration of a Virtual Tiered Virtual Network Resource System providing resources to users, in accordance with an embodiment of the present disclosure. As shown, Virtual Tiered Virtual Network Resource (VTVNR) system 105 is enabled to provide virtual network resources for virtual platform 145 and virtual platform 150. VTVNR system 105 includes interface module 110, policy management module 115, monitoring module 120, service catalog module 125, resource management module 130, billing module 135, and analysis module 160. In this embodiment, resource management module 130 is enabled to manage virtual network resources enabled to be allocated by VTVNR system 105 and network bandwidth to internet 165. In many embodiments, a virtual platform may include one or more virtual machines executing one or more applications. In various embodiments, a VTVNR system may be enabled to provide virtual network resources to Physical data storage systems and/or physical computing systems as well as virtual machines and/or virtual platforms.

As shown, User 140 is enabled to communicate to VTVNR System 105 using interface module 110. User 140 is enabled to create, remove, and/or modify virtual resources managed by resource management module 130. User 140 is enabled to view available virtual network resources and/or tiers of virtual network resources using service catalog module 125. Service catalog module 125 is enabled to provide information relating to available virtual network resources, cost of available virtual network resources, and/or tiers of available virtual network resources. User 140 is enabled to use information from Service Catalog Module 125 to create, remove, and/or manage one or more policies within policy management module 115. Policy management module 115 is enabled to direct resource management module 130 to allocate, de-allocate, and/or manage virtual network resources for virtual platform 145 and virtual platform 150.

In this embodiment, resource management module 130 is enabled to allocate, de-allocate, and/or manage virtual network resources for users of VTVNR system 105. Resource management module 130 is enabled to allow bandwidth access to internet 165. Resource management module 130 is enabled to provide access to virtual network resources, such as, but not limited to, vLAN, vWAN, Interswitch, Load balancers. Resource management module 130 is enabled to affect virtual network performance through buffering, load balancing, and/or packet acceleration. Resource management module 130 is enabled to allocate services such as deduplication and/or compression on data being sent and/or received using virtual network services provided by VTVNR System 105.

In FIG. 1, analysis module 160 is enabled to provide a cost analysis and/or performance analysis of virtual network services used by user 140 during one or more periods of time. Billing module 135 is enabled to provide user 140 with the cost of services used by virtual platform 145 and virtual platform 150. In certain embodiments, an analysis module may be enabled to suggest alternative virtual network configurations based on one or more virtual network service cost profiles.

Figure 2:
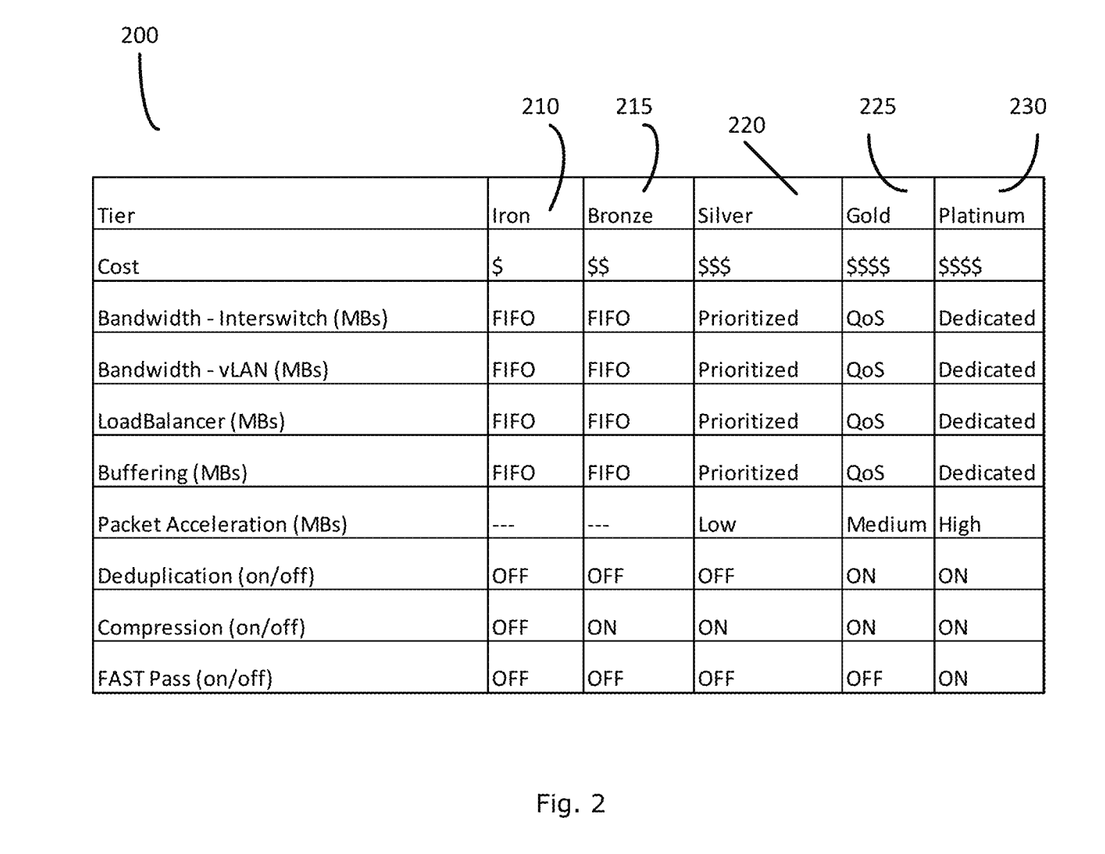
FIG. 2 is a simplified illustration of a chart of tiered virtual network services, in accordance with an embodiment of the present disclosure.

Refer to the example embodiment of FIG. 2. FIG. 2 is a simplified illustration of a chart of tiered virtual network services, in accordance with an embodiment of the present disclosure. As shown, Chart 200 includes information relating to tiers of service enabled to be provided from a Virtual Tiered Virtual Network Resource (VTVNR) system. Columns 210, 215, 220, 225, 230 each describe a tier of virtual network resources. Column 210 describes an Iron Tier of Virtual Network Resources. As shown from the chart, the Iron Tier is a low cost solution that enables use of Interswitching, a vLAN, LoadBalancer, and Buffering within the virtual network created within the Iron Tier using a First In First Out (FIFO) approach. Within an Iron Tier virtual Network, a virtual platform is not enabled to use packet acceleration, deduplication, compression, or FAST Pass. Column 215 describes a Bronze Tier of virtual network resources. The Bronze Tier is slightly more expensive than the Iron Tier solution. The Bronze Tier enables use of Interswitching, a vLAN, LoadBalancer, and Buffering within the virtual network created within the Bronze Tier using a First In First Out (FIFO) approach. Unlike the Iron Tier, Bronze tier enables virtual platforms to utilize compression within a bronze tiered virtual network.

Column 220 describes services available within a Silver Tiered virtual network, which have a higher cost than Iron and Bronze tiered virtual networks. As shown in Column 220, a Silver Tiered virtual network is enabled to have prioritized usage for interswitch, vLAN, LoadBalancer, and/or buffering. Additionally, a Silver tiered Virtual Network may be enabled to use a low level of packet acceleration and data compression within the virtual network. In many embodiments, packet acceleration and/or data compression may be an option to be toggled on or off per user discretion. Column 225 describes services available under a gold tiered virtual network, which have a higher cost than iron, bronze, and silver tiered virtual networks. Using a gold tiered virtual network, virtual platforms are enabled to have a guaranteed Quality of Service for interswitching, vLAN, LoadBalancer, and/or Buffering. A gold tiered virtual network also enables a medium level of packet acceleration. A gold tiered virtual network includes deduplication and compression to be used in conjunction with the Virtual Network. In many embodiments, packet acceleration, deduplication, compression, and/or other services that may be available using a virtual network system, may be applied as levels (i.e., low, medium, high) or may be toggled on or off.

Column 230 describes services available with a platinum tiered virtual network, which has a cost equal to the gold tiered virtual network and a cost greater than the iron, bronze, and silver tiered virtual networks. A platinum tiered virtual network enables dedicated access to interswitching between network resources, vLAN, loadbalancer, and buffering resources on a prioritized basis. Further, a platinum virtual network is enabled to use a high level of packet acceleration, deduplication, compression as well as have access to FAST Pass resources. In many embodiments, use of virtual network resources may be measured by amount of data per second throughput, such as, but not limited to, Megabytes per second and/or Gigabytes per second.

Figure 3:
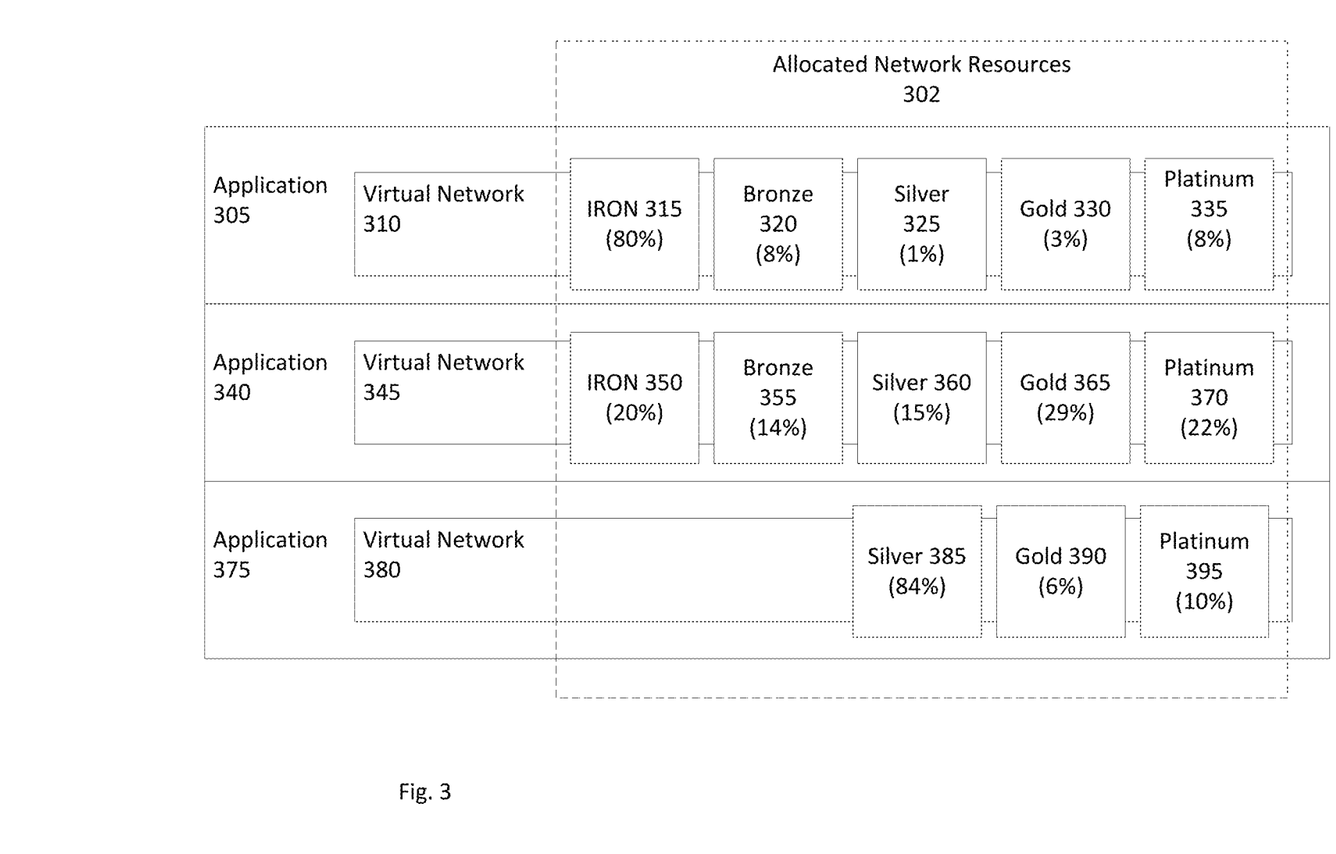
FIG. 3 is a simplified illustration of applications using tiered virtual network resources, in accordance with an embodiment of the present disclosure.

Refer to the example embodiment of FIG. 3. FIG. 3 is a simplified illustration of applications using tiered virtual network resources, in accordance with an embodiment of the present disclosure. In this embodiment, total allocated network resources 302 includes resources allocated to each application. Application 305 is utilizing virtual network 310 which has a policy which uses 80% of Iron Tier 315, 8% of Bronze Tier 320, 1% of Silver tier 325, 3% of Gold Tier 330, and 8% of Platinum Tier 335. The percentages associated with each tier indicates the amount of time over the course of a billing/usage period that application 305 uses each tier of virtual network resources. Application 340 utilizes virtual network 345 which allocates 20% to Iron tier 350, 14% to bronze tier 355, 15% to Silver Tier 360, 29% to Gold Tier 365, and 22% to platinum Tier 370. Application 375 uses virtual network 380 which allocates 84% to silver tier 385, 6% to gold tier 390, and 10% to Platinum Tier 395. As shown from these virtual network implementations, Application 305 does not need high priority resources as the percent used of silver tier 325, gold tier 330, and platinum tier 335 are low, with the majority of virtual network 310 being allocated at iron tier 315. On the other hand, Application 340 requires more performance from Virtual Network 345 versus the performance requirements that Application 305 has upon virtual network 310. Application 375 requires more virtual networking resources than application 340 and application 305 as virtual network 380 only includes silver, gold, and platinum tiered virtual network resources.

Figure 4:
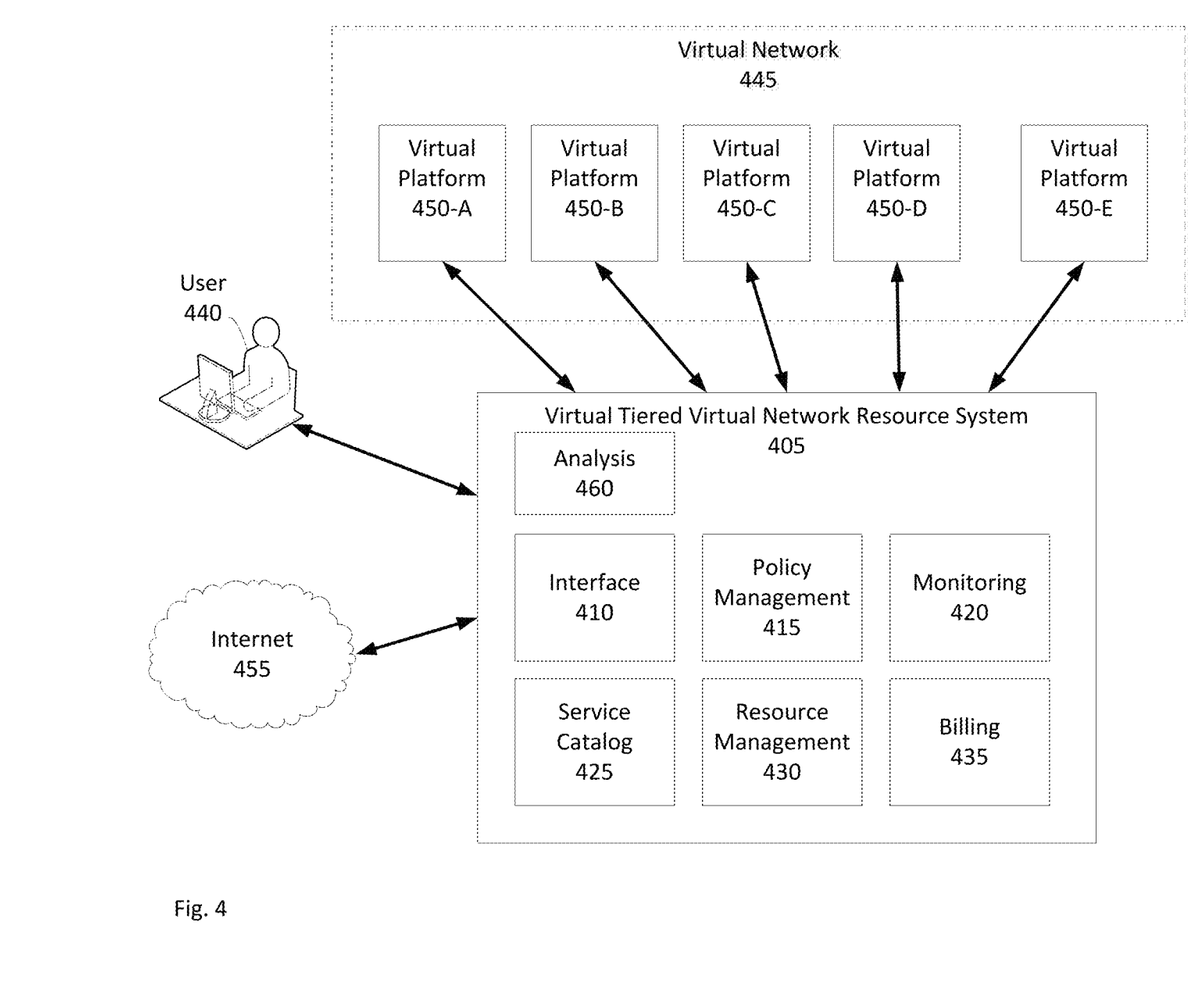
FIG. 4 is a simplified illustration of a Virtual Tiered Virtual Network Resource (VTVNR) system, in accordance with an embodiment of the present disclosure.

Refer to the example embodiment of FIG. 4. FIG. 4 is a simplified illustration of a Virtual Tiered Virtual Network Resource (VTVNR) system, in accordance with an embodiment of the present disclosure. VTVNR system 405 includes interface module 410, policy management module 415, monitoring module 420, service catalog 425, resource management module 430, billing module 435, and analysis module 460. VTVNR system 405 is in communication with internet 455 and is enabled to provide an amount of bandwidth to internet 455 using resource management module 430. User 440 is in communication with VTVNR system 405 and is enabled to create, remove, and/or modify one or more policies managed by policy management module 415 to affect virtual network 445 which is enabled to be utilized by Virtual Platforms (450A-E, 450 Generally). User 440 is enabled to use policy management module 415 and service catalog module 425 to create one or more policies for managing virtual network 445. VTVNR system 405 is enabled to use monitoring module 420 to monitor usage of virtual network 445 and predict over usage and/or under usage of VTVNR system 405 resources. Billing module 435 is enabled to query monitoring module 420 to associate a cost with resources used by creating and maintaining virtual network 445. Billing module 435 is enabled to provide cost of used resources from VTVNR system 405 to user 440. In many embodiments, an analysis module may be enabled to provide suggested alternative virtual network implementation based on cost and/or performance parameters defined by the user.

Figure 5:
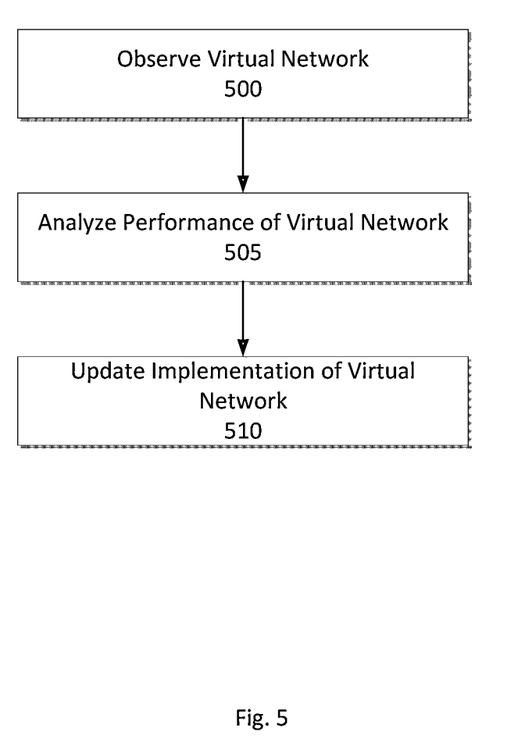
FIG. 5 is a simplified flowchart of a method of managing a virtual network using a Virtual Tiered Virtual Network Resource System as shown in FIG. 4, in accordance with an embodiment of the present disclosure.

Refer to the example embodiment of FIGS. 4 and 5. FIG. 5 is a simplified flowchart of a method of managing a virtual network using a Virtual Tiered Virtual Network Resource System as shown in FIG. 4, in accordance with an embodiment of the present disclosure. In FIG. 4, Virtual Tiered Virtual Network Resource (VTVNR) System 405 includes interface module 410, policy management module 415, monitoring module 420, service catalog module 425, resource management module 430, billing module 435, and analysis module 460. User 440 is using interface module 410 to request that monitoring module 420 observe virtual network 445 (Step 500). Analysis module 460 uses output from monitoring module 420 to analyze virtual network 445 (Step 505) by comparing the output with alternative tiered virtual network resources available as shown by service catalog 425. Analysis module 460 queries service catalog module 425 and billing module 435 to determine suggested alternatives to the current implementation of Virtual network 445 to improve performance and/or cost efficiency. Analysis module 460 provides suggested alternatives to user 440. User 440 directs resource management 430 to update the implementation of virtual network 445 (Step 510).

Figure 6:
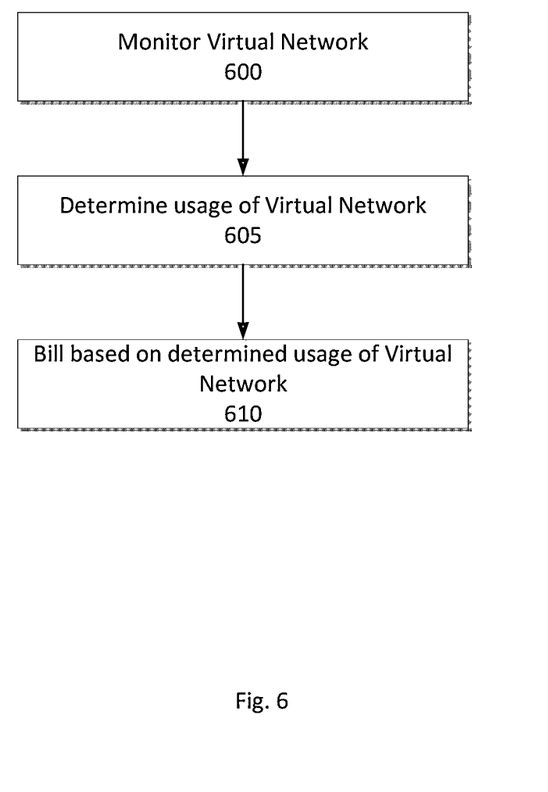
FIG. 6 is a simplified flowchart of a method of billing for usage of a virtual network as shown in FIG. 4, in accordance with an embodiment of the present disclosure.

Refer to the example embodiments of FIGS. 4 and 6. FIG. 6 is a simplified flowchart of a method of billing for usage of a virtual network as shown in FIG. 4, in accordance with an embodiment of the present disclosure. In FIG. 4, Virtual Tiered Virtual Network Resource (VTVNR) System 405 includes interface module 410, policy management module 415, monitoring module 420, service catalog module 425, resource management module 430, billing module 435, and analysis module 460. Monitoring module 420 monitors usage of virtual network 445 (Step 600). Monitoring module 420 determines an amount of usage of virtual network 445 over a specified period of time (Step 605) and updates billing module 435 as to the amount of usage of virtual network 445. Billing module 435 provides a bill to user 440 based on determined usage of virtual network 445 (Step 610).

Figure 7:
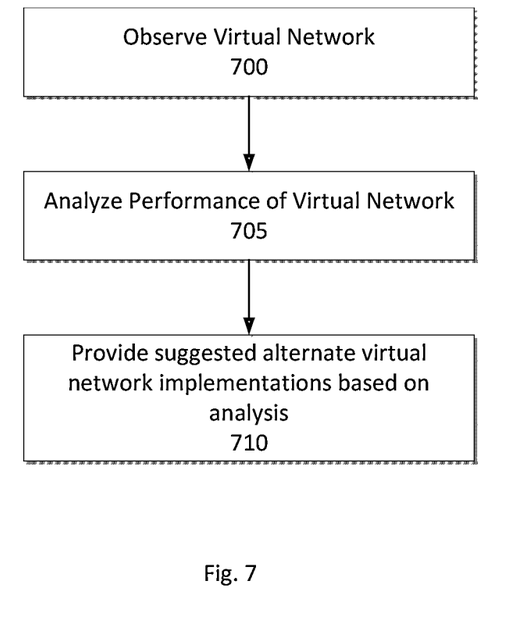
FIG. 7 is a simplified flowchart of a method of analyzing a virtual network provided by a Virtual Tiered Virtual Network Resource (VTVNR) System as shown in FIG. 4, in accordance with an embodiment of the present disclosure.

Refer to the example embodiment of FIGS. 4 and 7. FIG. 7 is a simplified flowchart of a method of analyzing a virtual network provided by a Virtual Tiered Virtual Network Resource (VTVNR) System as shown in FIG. 4, in accordance with an embodiment of the present disclosure. In FIG. 4, Virtual Tiered Virtual Network Resource (VTVNR) System 405 includes interface module 410, policy management module 415, monitoring module 420, service catalog module 425, resource management module 430, billing module 435, and analysis module 460. Monitoring module 420 observes virtual network 445 (Step 700), which services Virtual Platforms 450. Analysis module 460 uses output from monitoring module 420 to analyze the performance of virtual network 445 (Step 705). Analysis module 460 provides analysis and suggested alternative virtual network implementations based on analysis (Step 710) to User 440. User 440 is enabled to modify one or more policies in policy management module 415 to affect implementation of virtual network 445 by resource management 430.

Figure 8:
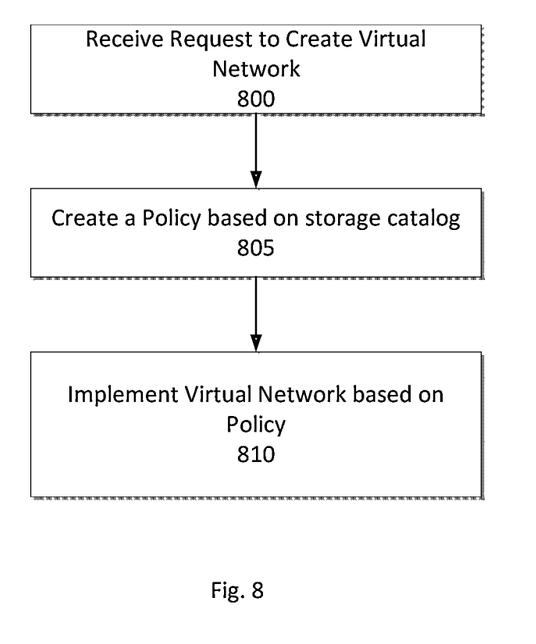
FIG. 8 is a simplified flowchart of a method of creating a virtual network using a Virtual Tiered Virtual Network Resource (VTVNR) system as shown in FIG. 4, in accordance with an embodiment of the present disclosure.

Refer to the example embodiments of FIGS. 4 and 8. FIG. 8 is a simplified flowchart of a method of creating a virtual network using a Virtual Tiered Virtual Network Resource (VTVNR) system as shown in FIG. 4, in accordance with an embodiment of the present disclosure. In FIG. 4, Virtual Tiered Virtual Network Resource (VTVNR) System 405 includes interface module 410, policy management module 415, monitoring module 420, service catalog module 425, resource management module 430, billing module 435, and analysis module 460. VTVNR System 405 receives a request to create virtual network 445 from user 440 (Step 800). VTVNR System 405 provides access to service catalog module 425 for user 440 to create one or more policies for managing virtual network 445. User 440 creates a policy using policy management module 415 based on information from service catalog module 425 (Step 805). User 440 directs resource management module 430 to create virtual network 445 based on the created policies in policy management module 415. Resource management module 430 implements virtual network 445 based on the created policies within policy management module 415 (Step 810).

Figure 9:
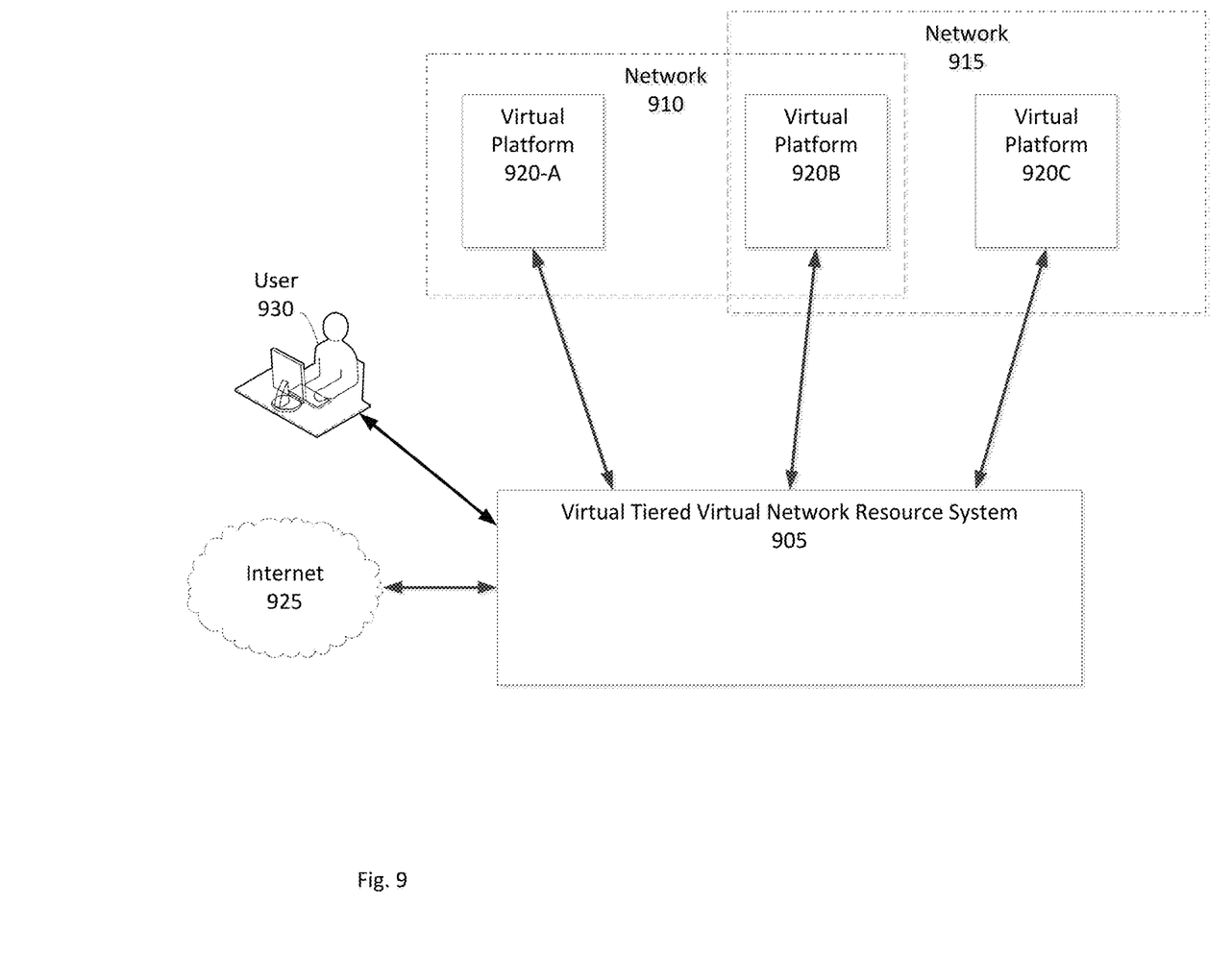
FIG. 9 is a simplified illustration of a Virtual Tiered Virtual Network Resource System managing multiple networks, in accordance with an embodiment of the present disclosure.

Refer to the example embodiment of FIG. 9. FIG. 9 is a simplified illustration of a Virtual Tiered Virtual Network Resource System managing multiple networks, in accordance with an embodiment of the present disclosure. As shown, Virtual Tiered Virtual Network Resource (VTVNR) System 905 is in communication with virtual platforms (920A-C, 920 Generally), internet 925, and user 930. User 930 is enabled to use VTVNR System 905 to create network 910 and network 915. As shown, network 910 includes Virtual Platform 920A and Virtual platform 920B. Network 915 includes virtual platform 920B and virtual platform 920C. In this embodiment, virtual platform 920B is a part of both network 910 and network 915, while virtual platform 920A only sees network 910 and virtual platform 920C only sees network 915C. In many embodiments, a VTVNR system may be enabled to manage a plurality of virtual networks. In various embodiments, a VTVNR system may be enabled to create, delete, and/or modify one or more virtual networks being managed by the VTVNR system.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
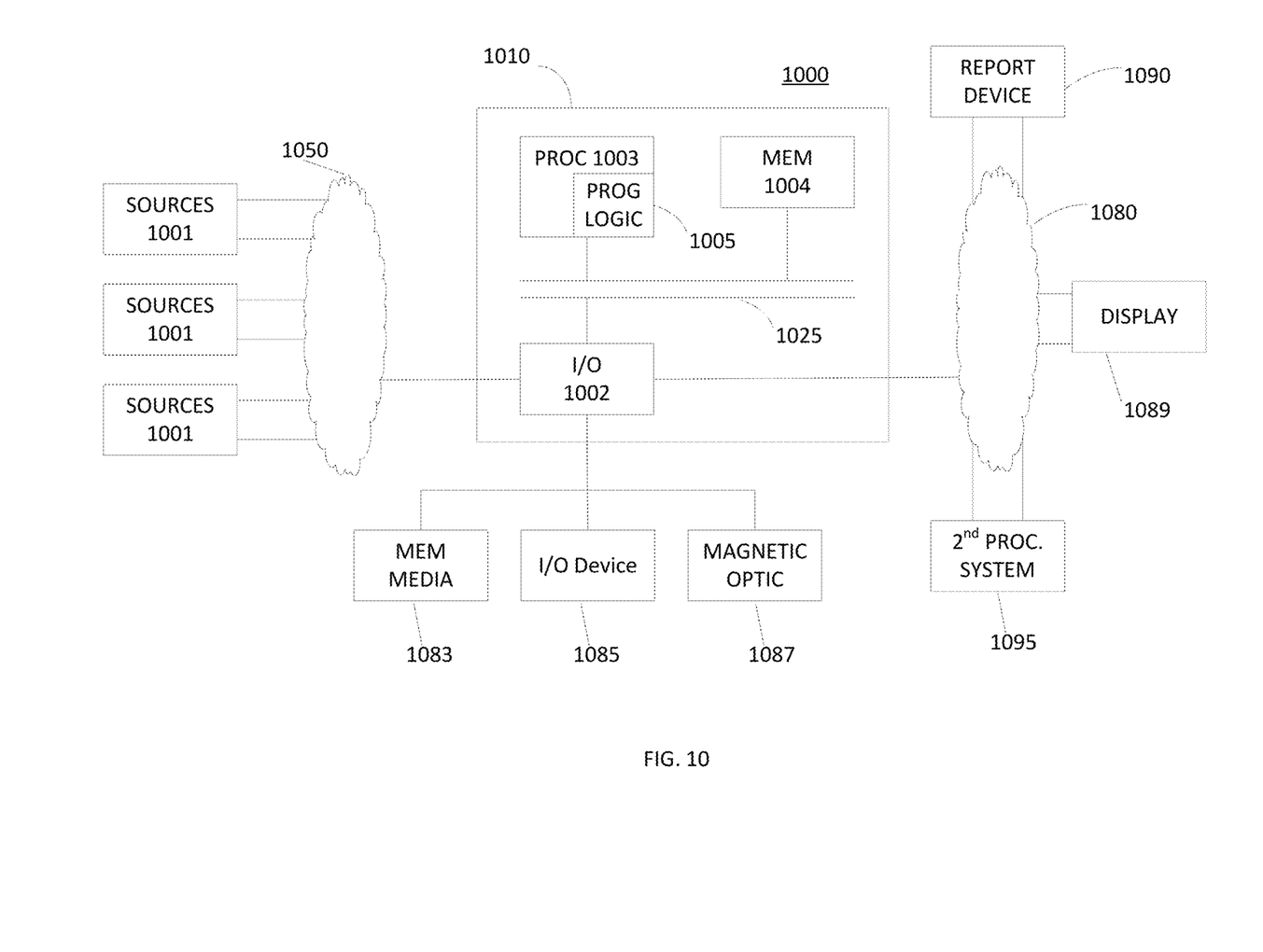
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O ports 1002 may provide connectivity to memory media 1083, I/O devices 1085, and drives 1087, such as magnetic or optical drives. The I/O ports 1002 may also provide connectivity to sources 1001 via network 1050. The I/O ports 1002 may further provide connectivity to a report device 1090, display 1089 and a second processing system 1095 via network 1080. When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
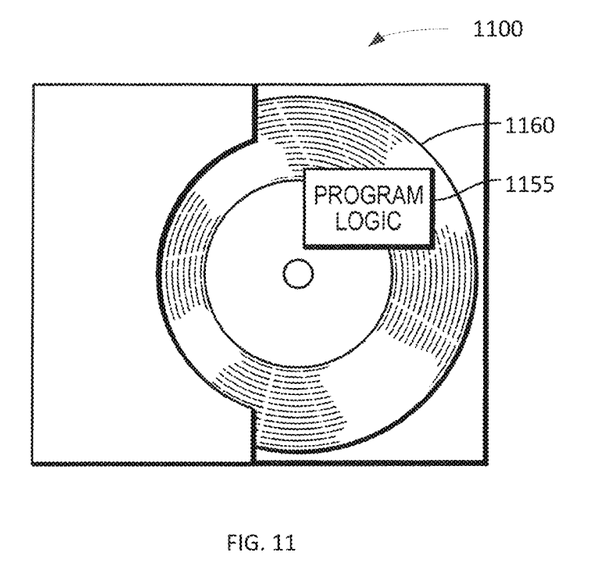
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:
1. A computer-executable method comprising:
   implementing a virtual tiered virtual network resource system;

receiving a request, via an interface of the virtual tiered virtual network resource system, to create a virtual network;

creating, via logic of the virtual tiered virtual network resource system, a policy based on the virtual network resources described by the service catalog module;

providing, via logic of the virtual tiered virtual network resource system, the virtual network based on the created policy, the virtual network using portions of respective ones of a plurality of tiers of the virtual network resources, a first one of the tiers of the virtual network resources comprising a first level of a resource of a first type and a second level of a resource of a second type, and a second one of the tiers of the virtual network resources comprising levels of the respective resources of the first and second types that are different than the respective levels of the first tier;

monitoring, via logic of the virtual tiered virtual network resource system, usage of at least the first and second ones of the tiers of the virtual network by one or more virtual platforms of the virtual network; and automatically adjusting, via the logic of the virtual tiered virtual network resource system, allocation of at least the first and second ones of the tiers of the virtual network to the one or more virtual platforms of the virtual network, based on the monitored usage;

wherein automatically adjusting allocation of at least one of the first and second ones of the tiers of the virtual network to the one or more virtual platforms of the virtual network comprises:

analyzing performance of the virtual network based on the monitored usage;

generating one or more suggested alternative virtual network implementations based on (i) the analyzed performance of the virtual network and (ii) querying a service catalog maintained by the virtual tiered virtual network resource system;

sending, via the interface of the virtual tiered virtual network resource system, the one or more suggested alternative virtual network implementations;

receiving, via the interface of the virtual tiered virtual network resource system, selection of at least one of the one or more suggested alternative virtual network implementations;

modifying, by the virtual tiered virtual network resource system, the created policy based on the selection of said at least one of the one or more suggested alternative virtual network implementations; and adjusting, by the virtual tiered virtual network resource system, implementation of the virtual network based on the modified created policy; and wherein the steps are executed by one or more processing devices each comprising a processor operatively coupled to a memory.

2. The computer-executable method of claim 1, further comprising:

automatically generating a bill, via logic of the virtual tiered virtual network resource system, based on usage of the one or more virtual platforms of the virtual network during a particular time period; and sending the bill to a user of the one or more virtual platforms.

3. The computer-executable method of claim 1, further comprising:

analyzing, via logic of the virtual tiered virtual network resource system, an output of the monitoring;

determining whether the one or more virtual platforms of the virtual network are being underutilized based on the analysis of the output of the monitoring; and upon determining that the one or more virtual platforms of the virtual network are being underutilized, providing a report based on the analysis, the report comprising at least one of the one or more suggested alternative virtual network implementations that have less underutilization of the one or more virtual platforms of the virtual network.

4. The computer-executable method of claim 1, further comprising:

analyzing, via logic of the virtual tiered virtual network resource system, an output of the monitoring;

determining whether the one or more virtual platforms of the virtual network are being overtaxed based on the analysis of the output of the monitoring; and upon determining that the one or more virtual platforms of the virtual network are being overtaxed, providing a report based on the analysis, the report comprising at least one of the one or more suggested alternative virtual network implementations that have less overtaxing of the one or more virtual platforms of the virtual network.

5. An apparatus, comprising:

at least one processor;

memory coupled to said at least one processor; and computer-executable program logic encoded in at least one module in the memory that when executed on said at least one processor cause the apparatus to perform the steps of:

implementing a virtual tiered virtual network resource system;

receiving a request, via an interface of the virtual tiered virtual network resource system, to create a virtual network;

creating, via logic of the virtual tiered virtual network resource system, a policy based on the virtual network resources described by the service catalog module;

providing, via logic of the virtual tiered virtual network resource system, the virtual network based on the created policy, the virtual network using portions of respective ones of a plurality of tiers of the virtual network resources, a first one of the tiers of the virtual network resources comprising a first level of a resource of a first type and a second level of a resource of a second type, and a second one of the tiers of the virtual network resources comprising levels of the respective resources of the first and second types that are different than the respective levels of the first tier;

monitoring, via logic of the virtual tiered virtual network resource system, usage of at least the first and second ones of the tiers of the virtual network by one or more virtual platforms of the virtual network; and automatically adjusting, via the logic of the virtual tiered virtual network resource system, allocation of at least the first and second ones of the tiers of the virtual network to the one or more virtual platforms of the virtual network, based on the monitored usage;

wherein automatically adjusting allocation of at least one of the first and second ones of the tiers of the virtual network to the one or more virtual platforms of the virtual network comprises:

analyzing performance of the virtual network based on the monitored usage;

generating one or more suggested alternative virtual network implementations based on (i) the analyzed performance of the virtual network and (ii) querying a service catalog maintained by the virtual tiered virtual network resource system;

sending, via the interface of the virtual tiered virtual network resource system, the one or more suggested alternative virtual network implementations;

receiving, via the interface of the virtual tiered virtual network resource system, selection of at least one of the one or more suggested alternative virtual network implementations;

modifying, by the virtual tiered virtual network resource system, the created policy based on the selection of said at least one of the one or more suggested alternative virtual network implementations; and adjusting, by the virtual tiered virtual network resource system, implementation of the virtual network based on the modified created policy.

6. The system of claim 5, wherein the computer-executable program logic when executed on said at least one processor further cause the apparatus to perform the steps of:

automatically generating a bill, via logic of the virtual tiered virtual network resource system, based on usage of the one or more virtual platforms of the virtual network during a particular time period; and sending the bill to a user of the one or more virtual platforms.

7. The system of claim 5, wherein the computer-executable program logic when executed on said at least one processor further cause the apparatus to perform the steps of:

analyzing, via logic of the virtual tiered virtual network resource system, an output of the monitoring;

determining whether the one or more virtual platforms of the virtual network are being underutilized based on the analysis of the output of the monitoring; and upon determining that the one or more virtual platforms of the virtual network are being underutilized, providing a report based on the analysis, the report comprising at least one of the one or more suggested alternative virtual network implementations that have less underutilization of the one or more virtual platforms of the virtual network.

8. The system of claim 5, wherein the computer-executable program logic when executed on said at least one processor further causes the apparatus to perform the steps of:

analyzing, via logic of the virtual tiered virtual network resource system, an output of the monitoring;

determining whether the one or more virtual platforms of the virtual network are being overtaxed based on the analysis of the output of the monitoring; and upon determining that the one or more virtual platforms of the virtual network are being overtaxed, providing a report based on the analysis, the report comprising at least one of the one or more suggested alternative virtual network implementations that have less overtaxing of the one or more virtual platforms of the virtual network.

9. A computer program product comprising:

a non-transitory computer readable medium encoded with computer executable code, the code, when executed by at least one processing device causes said at least one processing device to perform the steps of:

implementing a virtual tiered virtual network resource system;

receiving a request, via an interface of the virtual tiered virtual network resource system, to create a virtual network;

creating, via logic of the virtual tiered virtual network resource system, a policy based on the virtual network resources described by the service catalog module;

providing, via logic of the virtual tiered virtual network resource system, the virtual network based on the created policy, the virtual network using portions of respective ones of a plurality of tiers of the virtual network resources, a first one of the tiers of the virtual network resources comprising a first level of a resource of a first type and a second level of a resource of a second type, and a second one of the tiers of the virtual network resources comprising levels of the respective resources of the first and second types that are different than the respective levels of the first tier;

monitoring, via logic of the virtual tiered virtual network resource system, usage of at least the first and second ones of the tiers of the virtual network by one or more virtual platforms of the virtual network; and automatically adjusting, via the logic of the virtual tiered virtual network resource system, allocation of at least the first and second ones of the tiers of the virtual network to the one or more virtual platforms of the virtual network, based on the monitored usage;

wherein automatically adjusting allocation of at least one of the first and second ones of the tiers of the virtual network to the one or more virtual platforms of the virtual network comprises:

analyzing performance of the virtual network based on the monitored usage;

generating one or more suggested alternative virtual network implementations based on (i) the analyzed performance of the virtual network and (ii) querying a service catalog maintained by the virtual tiered virtual network resource system;

sending, via the interface of the virtual tiered virtual network resource system, the one or more suggested alternative virtual network implementations;

receiving, via the interface of the virtual tiered virtual network resource system, selection of at least one of the one or more suggested alternative virtual network implementations;

modifying, by the virtual tiered virtual network resource system, the created policy based on the selection of said at least one of the one or more suggested alternative virtual network implementations; and adjusting, by the virtual tiered virtual network resource system, implementation of the virtual network based on the modified created policy.

10. The computer program product of claim 9, wherein the code when executed by said at least one processing device further causes said at least one processing device to perform the steps of:

automatically generating a bill, via logic of the virtual tiered virtual network resource system, based on usage of the one or more virtual platforms of the virtual network during a particular time period; and sending the bill to a user of the one or more virtual platforms.

11. The computer program product of claim 9, wherein the code when executed by said at least one processing device further causes said at least one processing device to perform the steps of:
- analyzing, via logic of the virtual tiered virtual network resource system, an output of the monitoring;
- determining whether the one or more virtual platforms of the virtual network are being underutilized based on the analysis of the output of the monitoring; and
- upon determining that the one or more virtual platforms of the virtual network are being underutilized, providing a report based on the analysis, the report comprising at least one of the one or more suggested alternative virtual network implementations that have less underutilization of the one or more virtual platforms of the virtual network.

12. The computer program product of claim 9, wherein the code when executed by said at least one processing device further causes said at least one processing device to perform the steps of:
- analyzing, via logic of the virtual tiered virtual network resource system, an output of the monitoring;
- determining whether the one or more virtual platforms of the virtual network are being overtaxed based on the analysis of the output of the monitoring; and
- upon determining that the one or more virtual platforms of the virtual network are being overtaxed, providing a report based on the analysis, the report comprising at least one of the one or more suggested alternative virtual network implementations that have less overtaxing of the one or more virtual platforms of the virtual network.

13. The computer-executable method of claim 1, wherein the resource of the first type comprises an interswitch bandwidth resource and the resource of the second type comprises a vLAN bandwidth resource.

14. The computer-executable method of claim 1, wherein the resource of the first type comprises a load balancing resource and the resource of the second type comprises a buffering resource.

15. The computer-executable method of claim 1, wherein the resource of the first type comprises a packet acceleration resource and the resource of the second type comprises a storage tiering resource.

16. The computer-executable method of claim 1, wherein the resource of the first type comprises a deduplication resource and the resource of the second type comprises a compression resource.

17. The system of claim 5, wherein the resource of the first type comprises an interswitch bandwidth resource and the resource of the second type comprises a vLAN bandwidth resource.

18. The system of claim 5, wherein the resource of the first type comprises a load balancing resource and the resource of the second type comprises a buffering resource.

19. The system of claim 5, wherein the resource of the first type comprises a packet acceleration resource and the resource of the second type comprises a storage tiering resource.

20. The system of claim 5, wherein the resource of the first type comprises a deduplication resource and the resource of the second type comprises a compression resource.

* * * * *

UNITED STATES PATENT AND TRADEMARK OFFICE
CERTIFICATE OF CORRECTION

PATENT NO. : 11,805,069 B1
APPLICATION NO. : 14/585809
DATED : October 31, 2023
INVENTOR(S) : Christopher J. Gaudlip It is certified that error appears in the above-identified patent and that said Letters Patent is hereby corrected as shown below:

In the Claims

Claim 6, Column 13, Line 21, please delete "The system of" and insert therefor --The apparatus of--

Claim 7, Column 13, Line 30, please delete "The system of" and insert therefor --The apparatus of--

Claim 8, Column 13, Line 45, please delete "The system of" and insert therefor --The apparatus of--

Claim 17, Column 16, Line 17, please delete "The system of" and insert therefor --The apparatus of--

Claim 18, Column 16, Line 21, please delete "The system of" and insert therefor --The apparatus of--

Claim 19, Column 16, Line 24, please delete "The system of" and insert therefor --The apparatus of--

Claim 20, Column 16, Line 28, please delete "The system of" and insert therefor --The apparatus of--

Signed and Sealed this
Fifth Day of December, 2023

Katherine Kelly Vidal
*Director of the United States Patent and Trademark Office*